Aug. 20, 1935.  S. WILLIG  2,012,211
INFLATABLE SPIRAL TUBE
Filed Aug. 9, 1934  2 Sheets-Sheet 1
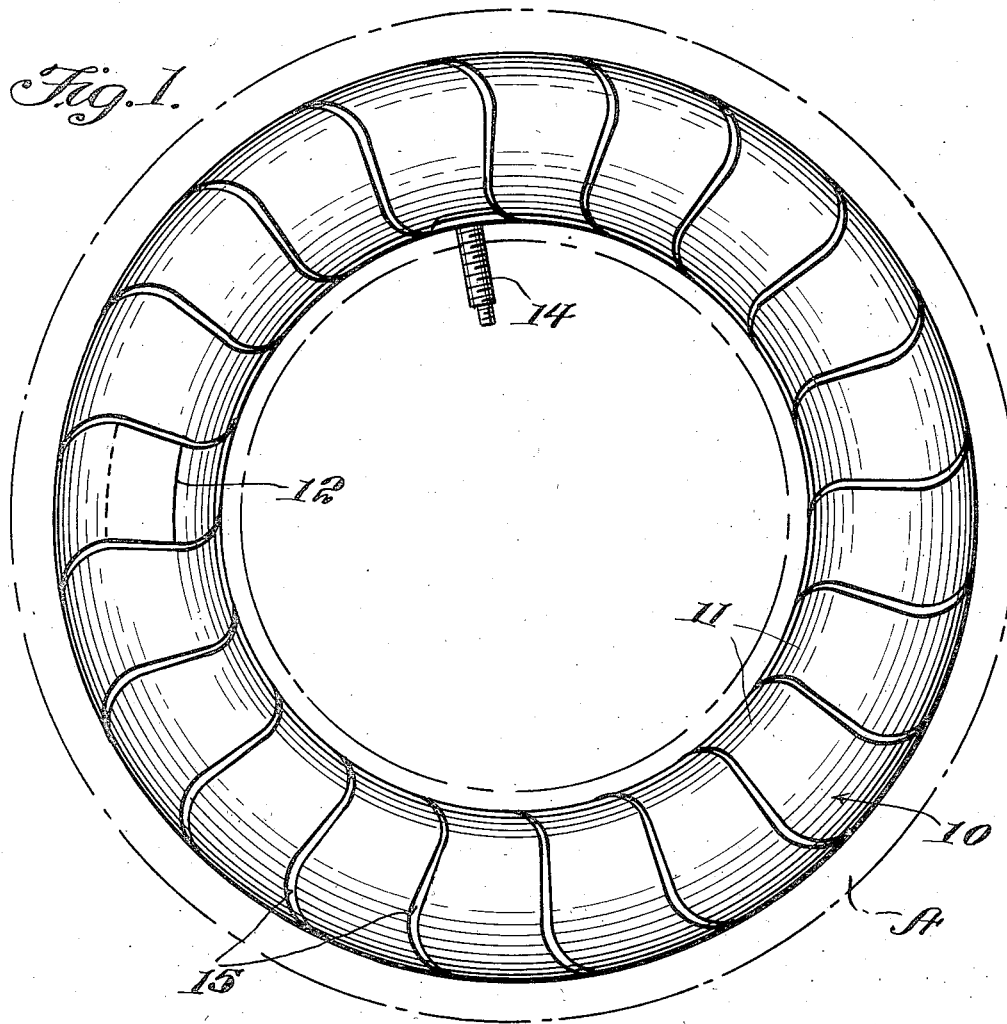
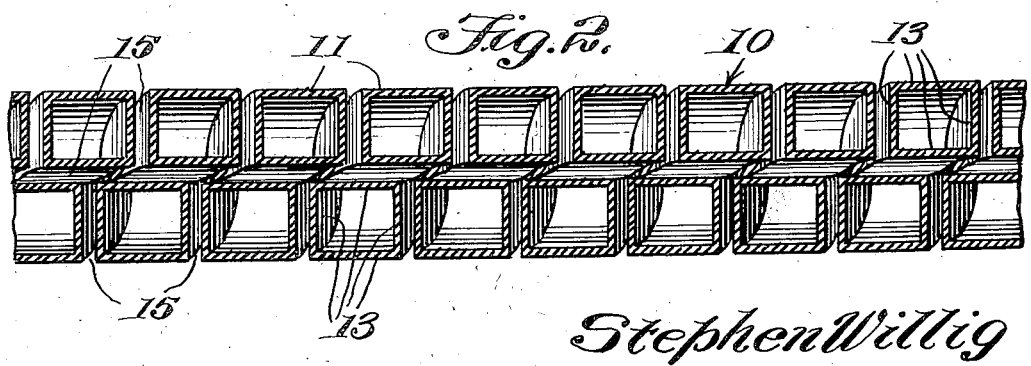
Stephen Willig
INVENTOR

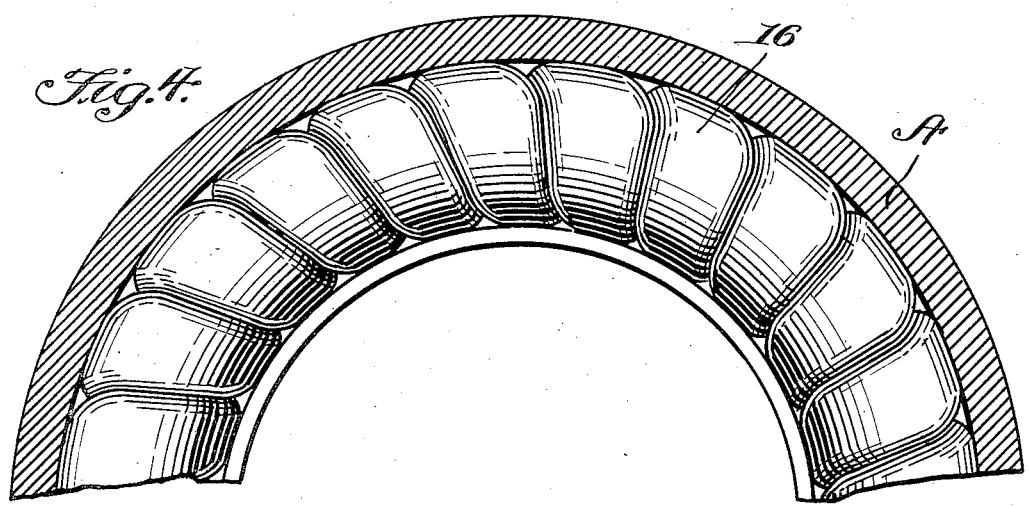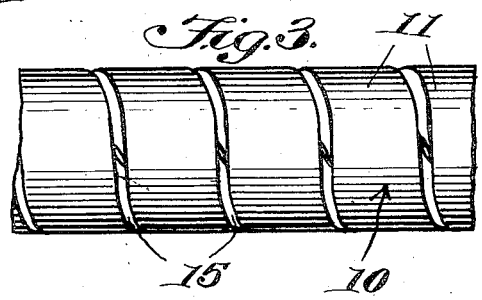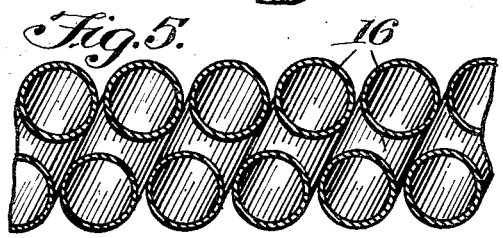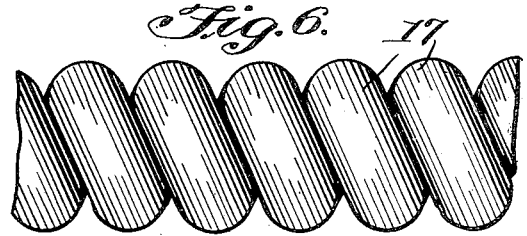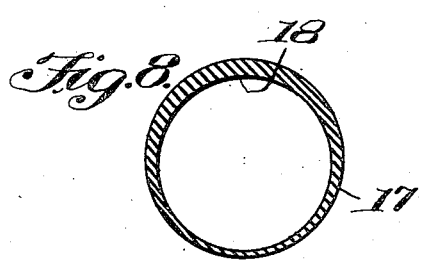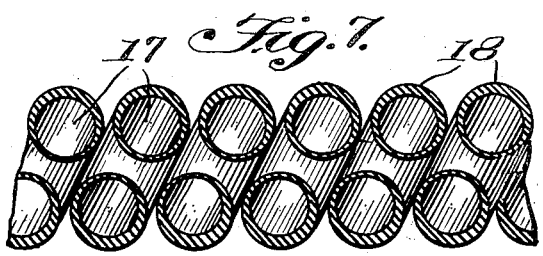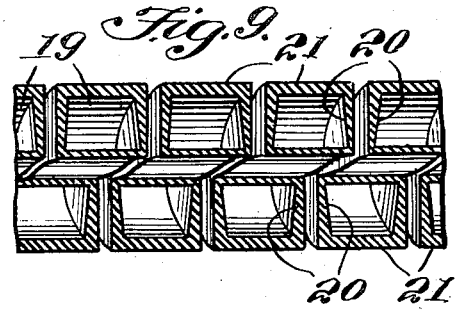

Patented Aug. 20, 1935

2,012,211

UNITED STATES PATENT OFFICE 2,012,211

INFLATABLE SPIRAL TUBE

Stephen Willig, Akron, Ohio

Application August 9, 1934, Serial No. 739,168

1 Claim. (Cl. 152—13)

The invention relates to a tube construction and more especially to an inflatable spiral tube.

The primary object of the invention is the provision of a tube of this character, wherein the same is of spiral contour and is usable as an inner tube for pneumatic tires or as a water or air hose, and in the use of this tube as an inner tube for a tire the formation thereof assures the extending and contracting of the spiral according to shocks and jars incident to the travel of the tire, so as to relieve undue strain upon said inner tube in the functioning thereof and also it will be maintained cool by reason of free circulation about the coils of the tube.

Another object of the invention is the provision of a tube of this character wherein the same is formed with a hollow convoluted body adaptable for inflation and the placing thereof within the shoe or casing of a pneumatic tire and in this use affords maximum cushioning action and sustaining power with minimum strain upon the tube in its entirety and more readily the respective coils or convolutions absorb blow strains, lessening blow-outs and withstanding weight strains, the tube being susceptible of extending and contracting in a spiral course and thus being self-adjusting coincident to conditions incident to the travel of the tire.

A further object of the invention is the provision of a tube of this character which is extremely simple in construction, thoroughly reliable and efficient in its purposes, strong, durable, readily and easily inflated and deflated when used as an inner tube, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:

Figure 1 is a side elevation of the tube constructed in accordance with the invention and in use as an inner tube for a pneumatic tire.

Figure 2 is a fragmentary vertical sectional view through the tube.

Figure 3 is a fragmentary elevation when disposed in a straight line.

Figure 4 is a fragmentary elevation showing a modified form of tube and used as an inner tube for a tire casing or shoe.

Figure 5 is a vertical sectional view thereof.

Figure 6 is a side elevation of a slight modification.

Figure 7 is a vertical sectional view therethrough.

Figure 8 is a transverse sectional view through one coil of the modified form shown in Figures 6 and 7.

Figure 9 is a view similar to Figure 2 showing a still further modification.

Similar reference characters indicate corresponding parts throughout the several views in the drawings.

Referring to the drawings in detail, particularly Figures 1 to 3 inclusive, A designates diagrammatically the shoe or casing of a pneumatic tire and within the same is fitted the tube embodying the present invention and hereinafter fully described.

This tube comprises a hollow body 10, preferably made from rubber or compositions having inherent elasticity or resiliency. This body 10 is formed in a spiral 11 and the ends of the said body are connected through the medium of a splice 12, so that the spiral 11 of the tube will assume an annular shape. Each spiral 11 is formed with the flats 13 at the sides, top and bottom, and one of such spirals has fitted therewith an inflating valved stem 14, so that the tube 10 can be filled with air for functioning as an inner tube for a pneumatic tire.

The spaces 15 as created between the spirals 11 of the tube 10 permit a circulation of air so as to minimize the heating of the inner tube when worn within the tire, that is, the shoe or casing A. The in or outside tube surface may be smooth, rough or specially formed.

It should be apparent that the tube 10 in its construction can extend and contract and each spiral 11 can absorb shocks and jars or strains incident thereto during the travel of the tire and thus relieving a distribution of such strain to the tire in its entirety. The tube 10 with the spirals 11 will support weight strains and such tube is self-adjusting.

In Figures 4 and 5 of the drawings there is shown a slight modification wherein the spirals 16 are of circular cross-sectional formation. In other words, each spiral 16 is of uniform thickness and of circular cross-sectional form.

In Figures 6, 7 and 8 of the drawings there is shown a further modification, wherein the spirals 17 are of increased thickness, as at 18, at the outer sides of each spiral throughout its extent. This thickness 18 gradually diminishes to the inner side of each spiral 17, as is clearly shown in Figure 8.

In Figure 9 of the drawings there is shown a further modification wherein the spirals 19 are thickened, each at opposite sides 20 and at the outermost area 21 thereof. The spiral 19 is of the formation alike to the spirals 11 shown in Figures 1, 2 and 3. The thickened sides 20 gradually diminish inwardly of the spiral 19.

By reason of the formation of the tube in spiral condition it has a maximum cushioning effect when employed in a pneumatic tire and the walls of the spirals function for upholding weight with less strain upon the tube in its entirety and such tube is self-adjusting, absorbing shocks and jars incident to the travel of the tire and eliminating, to a great degree, blow-outs.

The tube of the construction as hereinbefore set forth is serviceable as a water or air hose and affords maximum strength and durability, as well as free extending and contracting qualities.

It is, of course, to be understood that it is immaterial as to the direction of the spiral formation because the spiral contour may be either a right-hand direction spiral or a left-hand direction spiral.

What is claimed is:

An inflatable pneumatic inner tube for a tire comprising a single tubiformed elastic body having a spiral formation throughout its extent and of cross-sectional diameter to substantially fill a tire shoe or casing for receiving the same with the innermost portions of the spirals in close relation to each other, splices connecting the ends of the body to present an annulus and thickened outer portions to the respective spirals of said body.

STEPHEN WILLIG.